United States Patent
Kassner et al.

(10) Patent No.: US 10,919,538 B2
(45) Date of Patent: Feb. 16, 2021

(54) METHOD AND SYSTEM FOR PROVIDING A USER INTERFACE FOR AT LEAST ONE DEVICE OF A TRANSPORTATION VEHICLE

(71) Applicant: VOLKSWAGEN AKTIENGESELLSCHAFT, Wolfsburg (DE)

(72) Inventors: Astrid Kassner, Berlin (DE); Michael Klaas, Schwülper (DE)

(73) Assignee: Volkswagen Aktiengesellschaft

( * ) Notice: Subject to any disclaimer, the term of this patent is extended or adjusted under 35 U.S.C. 154(b) by 351 days.

(21) Appl. No.: 16/063,727

(22) PCT Filed: Dec. 20, 2016

(86) PCT No.: PCT/EP2016/082024
§ 371 (c)(1),
(2) Date: Jun. 19, 2018

(87) PCT Pub. No.: WO2017/108856
PCT Pub. Date: Jun. 29, 2017

(65) Prior Publication Data
US 2020/0269856 A1    Aug. 27, 2020

(30) Foreign Application Priority Data
Dec. 22, 2015    (DE) ................ DE10 2015 122 601.4

(51) Int. Cl.
*B60W 50/00*    (2006.01)
*B60W 40/08*    (2012.01)
*G06K 9/00*    (2006.01)

(52) U.S. Cl.
CPC ............ *B60W 50/00* (2013.01); *B60W 40/08* (2013.01); *G06K 9/00335* (2013.01); *B60W 2050/0008* (2013.01); *B60W 2050/0067* (2013.01)

(58) Field of Classification Search
CPC ................. B60W 50/00; B60W 40/08; B60W 2050/0008; B60W 2050/0067; G06K 9/00335
(Continued)

(56) References Cited

U.S. PATENT DOCUMENTS 10,061,508 B2    8/2018    Wild et al.
2015/0053066 A1    2/2015    Hampiholi et al.

FOREIGN PATENT DOCUMENTS

CN    104302504 A    1/2015
CN    104417457 A    3/2015
(Continued)

OTHER PUBLICATIONS

Search Report for International Patent Application No. PCT/EP2016/082024; dated Apr. 7, 2017.
(Continued)

*Primary Examiner* — Gertrude Arthur Jeanglaude
(74) *Attorney, Agent, or Firm* — Barnes & Thornburg LLP

(57) ABSTRACT

A method for providing a user interface for at least one device of a transportation vehicle. A query gesture of a user is detected, and the query gesture is assigned a query direction. The query direction determines an approach value for the device. The approach value is then used to generate a feedback signal which is output, and the device is selected when the approach value exceeds a specific threshold. An operating possibility display for the selected device is generated and output, and the operating possibility display includes information on the operating possibilities for the selected device. An operating gesture of the user is detected, and the detected operating gesture is used to generate a control signal for the selected device, and the control signal is transmitted to the device. Also disclosed is a system for (Continued)

providing a user interface for at least one device of a transportation vehicle.

14 Claims, 2 Drawing Sheets

(58) Field of Classification Search
USPC .......................................................... 701/36
See application file for complete search history.

(56) References Cited

FOREIGN PATENT DOCUMENTS

| CN | 104978107 A | 10/2015 | | |
|---|---|---|---|---|
| CN | 104978126 A | 10/2015 | | |
| DE | 102008037977 A1 | * | 2/2010 | ............. B60K 37/06 |
| DE | 102008037977 A1 | | 2/2010 | |
| DE | 102012010044 A1 | * | 11/2013 | ............. B60K 37/06 |
| DE | 102012010044 A1 | | 11/2013 | |
| WO | 2015049837 A1 | | 4/2015 | |

OTHER PUBLICATIONS

International Preliminary Report on Patentability for International Patent Application No. PCT/EP2016/082024; dated Jun. 26, 2018.

* cited by examiner

METHOD AND SYSTEM FOR PROVIDING A USER INTERFACE FOR AT LEAST ONE DEVICE OF A TRANSPORTATION VEHICLE

PRIORITY CLAIM

This patent application is a U.S. National Phase of International Patent Application No. PCT/EP2016/082024, filed 20 Dec. 2016, which claims priority to German Patent Application No. 10 2015 122 601.4, filed 22 Dec. 2015, the disclosures of which are incorporated herein by reference in their entireties.

SUMMARY

Illustrative embodiments relate to a method and a system for providing a user interface for at least one device of a transportation vehicle.

BRIEF DESCRIPTION OF THE DRAWINGS

The disclosed embodiments will now be explained with reference to the drawings.

DETAILED DESCRIPTION

Figure 1:
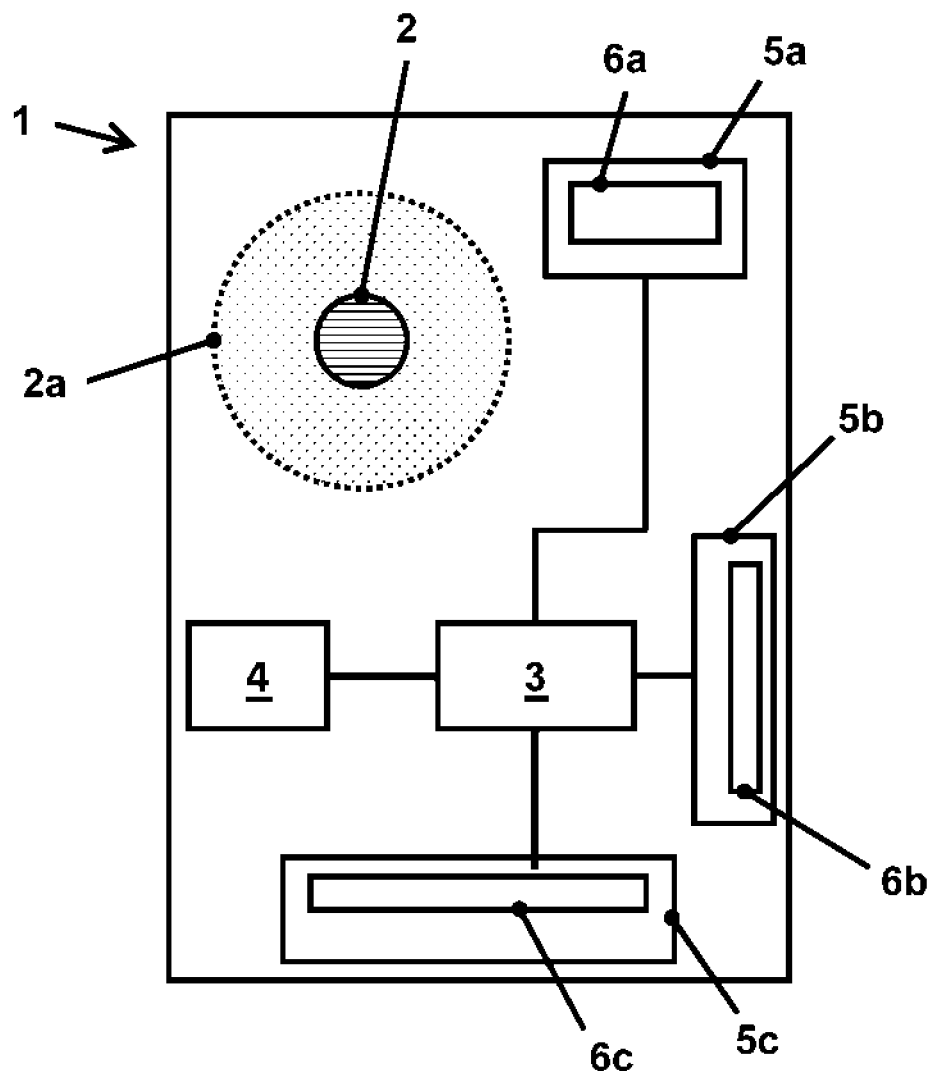
FIG. 1 shows an exemplary embodiment of the disclosed system.

In modern transportation vehicles, a multitude of devices are provided that can be actuated, adjusted and/or operated by electric switches or electronic operating devices. To permit a user to operate it, mechanical switches and controllers can be provided, for example, as well as operating devices that can perform various functions, such as with a touch screen and a graphical user interface.

In transportation vehicles, it is especially important for a user, in particular, the driver of the transportation vehicle, to be able to perform the operation quickly and easily without diverting an unnecessarily high level of attention away from traffic events. For this reason, gesture control systems are increasingly being used. Typically, gestures can be performed in an area in front of a display surface with a graphical user interface, wherein an acknowledgment can be shown on the display surface.

Disclosed embodiments provide a method and a system that permit the user to operate transportation vehicle devices in an especially intuitive and simple way with the aid of gestures.

This problem is solved by the disclosed method and the disclosed system.

In the aforementioned type of method, a user's initiation gesture is detected, wherein an initiation direction is associated with the initiation gesture and an approximate value is determined for the device based on the initiation direction. An acknowledgment signal is generated and emitted on the basis of the approximate value. When the approximate value exceeds a particular threshold value, the device is selected. A display of operating possibilities for the selected device is generated and displayed, wherein the operating possibility display contains information about possible operations for the selected device. An operating gesture by the user is then detected and, based on the detected operating gesture, a control signal for the selected device is generated and transmitted to the device.

In this way, the user can simply and intuitively operate the at least one device of the transportation vehicle using gestures. An actuation object, in particular, the user's hand, is used to perform a gesture. In the following explanations, the hand of the user is the actuation object; however, these statements should be generalized to include other actuation objects, such as a stylus.

A "gesture" is understood within the meaning of the disclosure to be a particular position of the user's hand or a particular movement that is performed by the user's hand. The gestures can be configured in a way that is known per se. They include pointing gestures, swiping gestures and those gestures that occur in everyday use, such as hand rotations, grabbing gestures and combinations of multiple such gestures, possibly performed in immediate succession. The gestures are performed in a detection space without the user having to establish a spatial reference to a particular device. It is not necessary to get close to or touch a particular object, for instance. As a result of the control by gestures, the user is provided with an especially simple and intuitive input possibility for controlling the device.

The direction of movement of the gestures is linked with a direction of movement or a function associated with the gesture. The direction of movement can be directly coupled with a mechanical function of the device. Specifically, the device can comprise an element that can be moved using a gesture. In this case, a movement of the element is performed on the basis of the control signal. The element can be an actuator, for instance. An element such as this can be actuated, for example, by a movement of a gesture that corresponds to the pushing or turning of an actuation element, wherein the corresponding movement is performed by the user without contact in the detection space. This kind of actuation of an element offers the benefit that the user does not have to touch an operating device or a particular surface area—as is the case with a touch-sensitive surface, for example. Instead, it is sufficient for the user to move his or her hand into the detection space, establish an association with the device that includes the element by the initiation gesture and then perform the gesture associated with the function of the element. The gesture here corresponds to a movement that is carried out by mechanical elements, for instance, so that it is very simple for the user to remember these gestures.

The gestures are detected contactlessly within the space, for example, by a camera system that records time-resolved video data from the detection space and associates the user movements detected with particular gestures by an analyzing unit. Alternatively or additionally, the gesture detection device comprises resistive and/or capacitive surfaces, by which a gesture can be detected. In cases where the gesture is divided into multiple phases, at least one phase is detected without contact in the space. Non-contact gestures have the benefit that the user does not have to pick up an operating mechanism with the hand to make operator entries. This is especially beneficial for the use of the disclosed method in a transportation vehicle.

In the disclosed method, an initiation gesture is first detected to locate and select the device that can be operated with gestures. For example, the user can point to a particular transportation vehicle device, and a determination can be made as to how exactly the user specifies the device with the initiation gesture. A direction in the space can be identified in this case from the detected gesture. In dependence upon the detected direction, a straight line in the space can be calculated, and elements can be specified, for example, which are arranged in a predetermined region surrounding the straight line calculated. This can further accelerate the selection process.

The device can be arranged in a certain location in the transportation vehicle or can be assigned to this location. This can be the actual position of a device, such as the position of a door, a speaker or an illumination system, for instance; however, a location in the transportation vehicle can also be associated with a function or device independently of the actual arrangement of physical elements, for example, to operate an air conditioner, a location can be defined that does not correspond to an actual arrangement of physical elements of the air conditioner.

An approximate value is determined for the device on the basis of the initiation direction of the initiation gesture. This quantifies how exactly the user is indicating the device and/or the location associated with the device. Based on the approximate value, an acknowledgment signal is emitted, for example, a light source can be arranged in the vicinity of the device, the intensity of which is increased as the approximate value rises. For instance, elements of the ambient lighting in the transportation vehicle can be arranged in the immediate vicinity of a door or a speaker of the transportation vehicle and can illuminate more brightly the more directly the user points in their direction. Alternatively or additionally, other parameters of the illumination can also be changed besides the brightness, such as the color or a parameter of a dynamic effect, e.g., a blinking frequency. Moreover, an audible or palpable acknowledgment signal can be emitted.

If the approximate value exceeds a threshold value because the user very precisely points at a device in the transportation vehicle, for instance, then the device is selected. The user can then perform an operating gesture to operate the device. The user is supported in the process by an operating possibility display: this symbolizes one or more of the possible operating gestures that the user can employ to operate the device. For example, the display can indicate a particular direction, such as by a symbol or a dynamic light effect in this direction. The user can interpret this in such a way that a movement in this direction is interpreted as a gesture. After selecting a closed sliding door, for example, a direction can be shown that substantially corresponds to the opening direction of the door. In this exemplary case, the user can perform a movement in this same direction and thereby bring about the opening of the door. In a further example, the operating possibility display can show two opposite directions for a speaker, wherein a corresponding movement is interpreted as a gesture to reduce or increase the volume.

Various known per se methods can be used to display the operating possibility display, such as displaying a symbol, a text message, a light effect, and especially by changing or choosing a parameter of the illumination, for example, the color, intensity and dynamic parameters such as blinking frequency. Here, too, an audible or palpable acknowledgment signal can be emitted.

Ultimately, an operating gesture by the user is detected and a corresponding control signal is generated. The control signal triggers the performance of a function of the selected device.

In at least one disclosed embodiment, the acknowledgment signal and/or the operating possibility display is emitted such that a spatial reference to the device is established. As a result, the user can recognize the device to which the acknowledgment signal or the operating possibility display refers.

For example, the display can occur in the immediate vicinity of the device, such as through output elements located on the surface of the device or in its immediate spatial surroundings, for example, an indicator light and/or another illumination system. Furthermore, a direction can be indicated, for example, by an arrow shape and/or a dynamic effect, such as a chase running toward the device, in which adjacently arranged illumination elements are activated and deactivated.

In a further configuration, the acknowledgment signal includes a light distribution, in particular, a chase. As a result, an output that the user can easily recognize can be produced.

According to the disclosure, a chase is understood to be a dynamic light effect in which an illumination parameter is modified, wherein the illumination parameter is modified sequentially along a direction of extension of an elongate illumination system, wherein the impression of a light effect moving forward along a direction is produced. A direction can be indicated in this way. For example, illumination elements arranged along a longitudinal direction can be activated successively and then deactivated again after a defined amount of time. A time offset between adjacently arranged illumination elements produces the impression of a movement, such as in a direction along a longitudinal extension of the illumination system, along which the illumination elements are arranged, and the chase effect can additionally be executed in opposite directions by the selection of a starting point, e.g., in the center of the illumination device. Moreover, multiple directions can be represented by a combination of multiple chase effects.

In a disclosed embodiment of the method, the light distribution of the acknowledgment signal includes a light parameter, in particular, a color, an intensity and/or a dynamic modification, wherein the light parameter is created as a function of the approximate value. An acknowledgment signal that can be detected especially easily can be produced as a result.

For example, the brightness of the ambient lighting of the transportation vehicle in the vicinity of a device can be controlled such that it changes more significantly the more precisely the initiation direction in the direction of the device is indicated. For example, the illumination can become brighter when the approximate value rises, that is, when the user points more precisely in the direction of the device. Moreover, a color of the illumination can change or a dynamic effect can be produced to indicate the device. The user can thereby modify the initiation gesture and especially the initiation direction in such a way that the approximate value comes closer to a maximum value and/or the threshold value for selecting the device.

In one configuration, the operating possibility display includes a dynamic light distribution, in particular, a chase, and at least one spatial direction is represented by the dynamic light distribution. In this way, the user can recognize when a potential operating gesture should be made in a particular direction. For example, a chase can be shown in the direction in which an operating gesture can be performed.

In a further configuration, the operating possibility display includes a graphical element. With this, a graphical representation can be used to indicate operating possibilities. For instance, a symbol or a graphical representation can be shown by a display surface, wherein complex operating possibilities and operating gestures can be represented.

In one development, a function is performed by the selected device on the basis of the control signal, wherein a function acknowledgment signal is generated and emitted while the function is being performed. The user can thereby recognize when and whether the device is performing the desired function.

For example, the function acknowledgment signal can be indicated by a light distribution, such as by ambient lighting of the transportation vehicle. A dynamic light effect can be produced, which can last for the period during which the function is being performed. For example, the function acknowledgment signal can be displayed while a parameter is gradually being adjusted, such as during the incremental adjustment of a volume or while a mechanical function, such as the opening of a door, is being carried out.

In a further configuration, an activation signal is received, and the operation of a device by gesture is activated on the basis of this activation signal. The gesture-based operation can specifically be activated in this way to avoid an inadvertent operating error. The activation signal can be a gesture. For example, the user can perform an activation gesture, whereby the operation of the device by gesture is activated, and the device can thereafter be operated by the disclosed method. The activation signal can additionally be detected by an actuation of the actuation element or by a voice command.

In one development, the user's initiation gesture and/or operating gesture is detected in a detection space, wherein the detection space includes the user's immediate surroundings in a transportation vehicle seat of the transportation vehicle. In this way, the gestures can be performed there, where the user is sitting.

Whereas, in conventional methods for gesture-based operation, gestures must typically be performed in the immediate vicinity of or in immediate spatial relation to the devices being operated; according to the disclosure, devices that are located far from the user can also be operated. For example, this applies to the control of a sliding door, a trunk lid, an air conditioner, a screen of the transportation vehicle, such as at the rear of the transportation vehicle, or an output device, such as a speaker. For example, the user can perform a gesture in the detection space, i.e., in the vicinity of his or her transportation vehicle seat, and can thereby operate devices located in a remote position in the transportation vehicle.

In at least one disclose embodiment, a transportation vehicle door is actuated or an air conditioner of a transportation vehicle is adjusted by the control signal. As a result, central devices of the transportation vehicle are controlled by gestures in a beneficial way. In a further configuration, the device comprises an audio playback system, and the operating possibilities include operating gestures in opposite directions, wherein especially the volume of the audio playback system is controlled by the generated control signal. A speaker can be adjusted. The gesture control can also be used to set other parameters and further devices of the transportation vehicle.

In one development, the operating gesture has a speed, and the control signal is generated as a function of the speed of the operating gesture. Differentiated control can thereby be facilitated by the operating gesture. For example, a setting parameter can be changed more significantly the faster the corresponding operating gesture is performed.

The disclosed system comprises a gesture detection unit, by which an initiation gesture by a user can be detected, wherein an initiation direction can be associated with the initiation gesture and an approximate value can be determined for the device based on the initiation direction. It further comprises a control unit, by which an acknowledgment signal can be generated on the basis of the approximate value, as well as an output unit, by which the acknowledgment signal can be emitted. Thus, when the approximate value exceeds a particular threshold value, the device can be selected by the control unit and an operating possibility display for the selected device can be generated and displayed by the output unit. The operating possibility display contains in this case information about the operating possibilities for the selected device, wherein an operating gesture by the user can also be detected by the gesture detection unit and, based on the detected operating gesture, a control signal for the selected device can be generated and transmitted to the device by the control unit.

The disclosed system is configured to implement the method as described above. The system thus offers the same benefits as the disclosed method.

In at least one disclosed embodiment of the system, the output unit has at least one elongate illumination system, which extends from a first position to a second position. The acknowledgment signal and/or the operating possibility display includes a dynamic light effect that can be generated in such a way that an illumination parameter is modified along the elongate illumination device starting from the first position to the second position. In this way, a dynamic output that can be detected quickly and intuitively can be produced. A chase effect can thereby be produced.

In one development, the elongate illumination system comprises a plurality of light sources arranged adjacently to each other, wherein light can be emitted by the light sources to produce the acknowledgment signal and/or the operating possibility display, wherein the dynamic light effect can be generated such that the light parameter of the light that is emitted by the light sources of individual light sources arranged adjacently to each other or by groups of light sources arranged adjacently to each other can be changed sequentially.

Thanks to this embodiment of the disclosed method, the illumination parameter can be modified especially easily, and it is simpler to generate a chase, wherein multiple light sources are activated one after the other and in a coordinated state. The light sources can be activated independently of each other so that any desired illumination patterns can be produced. Instead of merely a change in the illumination parameter, a light choreography can be produced in which the light parameters of the various light sources are changed in a certain order. The light sources can be light-emitting diodes. Furthermore, the light-emitting diodes can be arranged next to each other or one above the other. Alternatively, the light-emitting diodes can also be arranged in a matrix such that the illumination system is provided as an LED matrix. Even when an LED matrix is used, a light choreography can be generated. In so doing, light patterns produced can be changed in a certain order, for example.

In a further development, the device comprises a sliding door, an air conditioner, a screen or an audio playback system of the transportation vehicle. Central devices of the transportation vehicle can thereby be operated by gestures in a beneficial way.

An exemplary embodiment of the disclosed system is explained with reference to FIG. 1.

A user 2 is located in a transportation vehicle 1. In the exemplary embodiment shown, the user 2 is a driver 2 of the transportation vehicle 1 and is situated in a transportation vehicle seat at the left front of the transportation vehicle 1. A region around the driver 2 is indicated as the detection space 2a. In the case shown here, the detection space 2a extends in a circle around the driver 2, but it can occupy any given space in other exemplary embodiments.

The transportation vehicle 1 comprises a control unit 3, which is coupled to a gesture detection unit 4 and to devices 5a, 5b, 5c of the transportation vehicle 1. The transportation vehicle devices are in this case a speaker 5a, a sliding door 5b and a trunk lid 5c. Each of the devices 5a, 5b, 5c of the transportation vehicle 1 includes an output unit 6a, 6b, 6c, which in the exemplary embodiment shown here are configured as illumination systems 6a, 6b, 6c. Each of the illumination systems 6a, 6b, 6c is arranged in the direct spatial environment of devices 5a, 5b, 5c of the transportation vehicle 1, in particular, on an upper edge of the respective device 5a, 5b, 5c. For example, the illumination system 6b runs on the upper edge of the sliding door 5b. In further exemplary embodiments, the arrangement and design of the output units 6a, 6b, 6c can be executed in different ways and can be adapted to the conditions of the system.

An exemplary embodiment of an output unit of the disclosed system is explained with reference to FIGS. 2A and 2B. The exemplary embodiment of the disclosed system explained above with reference to FIG. 1 is used as a basis.

Figure 2B:
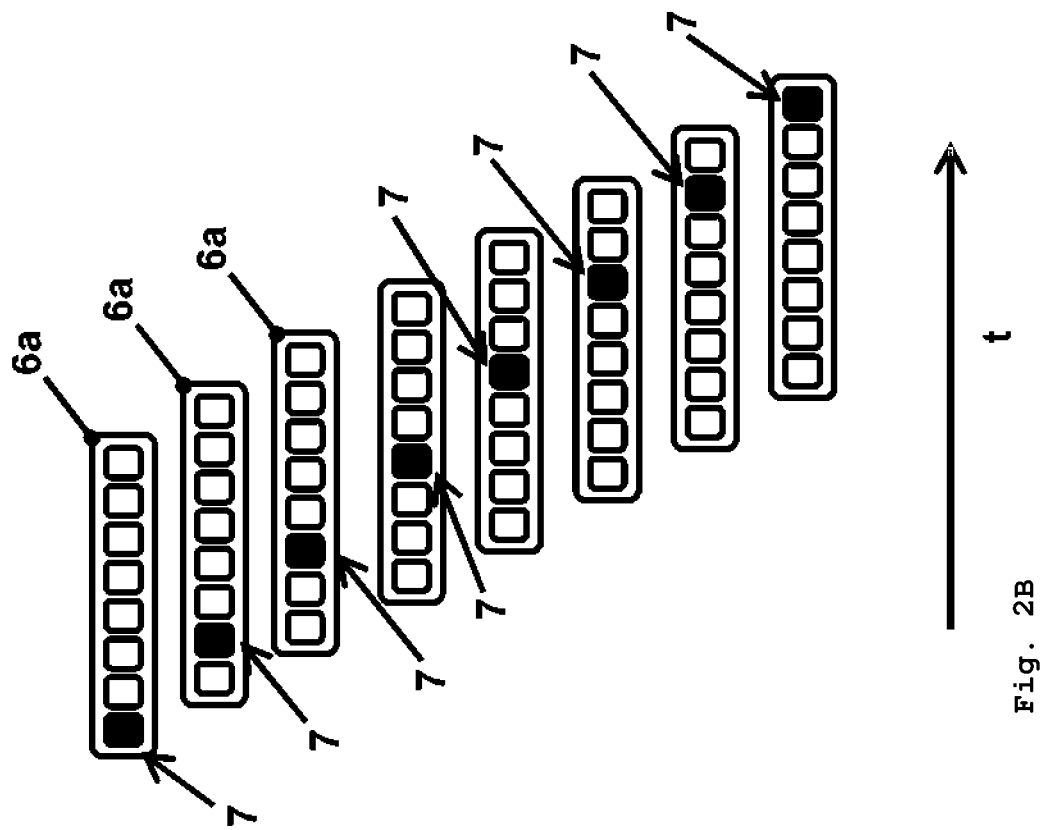
FIGS. 2A and 2B show an exemplary embodiment of an output unit for the disclosed system.
Figure 2A:
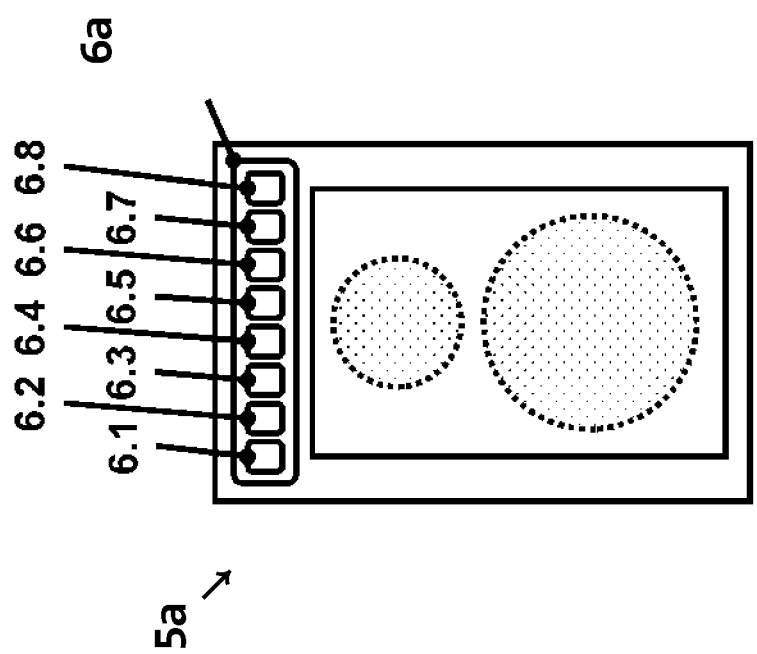

The speaker 5a shown in FIG. 2A includes illumination system 6a. Illumination system 6a, in turn, comprises light sources 6.1 to 6.8, which are arranged next to each other on the upper edge of the speaker 5a. The individual light sources 6.1 to 6.8 can be activated individually.

For example, a chase effect can be displayed by illumination system 6a, as shown in FIG. 2B. FIG. 2B shows the state of illumination system 6a at various points in time, wherein illumination system 6a is represented successively in the respective states from top to bottom, wherein the change over time is represented by the displacement along the time axis t. To generate the chase effect, at least one illumination parameter of the light sources 6.1 to 6.8 is modified, wherein the modification is changed successively for light sources 6.1 to 6.8 which are arranged adjacently to each other. In the example shown, the illumination parameter concerns a light intensity and/or the activation and deactivation of individual light sources 6.1 to 6.8. One illuminating light source 7 lights up at each point in time respectively; the light sources 6.1 to 6.8 thus light up in succession. In the example shown, a direction to the right is signaled in this way.

In other exemplary embodiments, the modified illumination parameter can alternatively or additionally involve a color, an intensity and/or a dynamic parameter, such as a blinking frequency. The chase effect can furthermore be implemented in different directions, possibly also by a combination of multiple chase effects in different directions.

An exemplary embodiment of the disclosed method is explained with reference to FIGS. 1, 2A and 2B. The disclosed system explained above with reference to FIGS. 1, 2A and 2B is used as a basis in this case.

In a first operation, the user 2 performs an initiation gesture in the detection space 2a. In the exemplary embodiment shown, this is a pointing gesture, in which the user indicates in a particular direction with his or her hand. The initiation gesture is detected by the gesture detection unit 4 of the transportation vehicle 1, and the initiation direction of the initiation gesture is identified. An approximate value is determined for the initiation gesture for each of devices 5a, 5b, 5c of the transportation vehicle 1. The approximate value quantifies how the initiation direction is correlated with each respective device 5a, 5b, 5c; in other words, a probability is determined, for example, with which the initiation gesture can be associated with each respective device 5a, 5b, 5c of the transportation vehicle 1. The approximate value becomes greater the more precise the driver 2 indicates the initiation direction toward a device 5a, 5b, 5c. The approximate value reaches a maximum when the driver 2 performs the initiation gesture in such a way that the initiation direction is pointed directly at one of the devices 5a, 5b, 5c.

For the devices 5a, 5b, 5c of the transportation vehicle 1, acknowledgment signals for the initiation gesture are generated and emitted on the basis of the respective approximate values. Here, the output occurs by the illumination systems 6a, 6b, 6c of devices 5a, 5b, 5c, which in the exemplary embodiment shown here are long rows of individual light sources 6.1 to 6.8 arranged on the edge of devices 5a, 5b, 5c. The greater the approximate value for a device 5a, 5b, 5c, the brighter the light sources 6.1 to 6.8 of the illumination systems 6a, 6b, 6c associated with the respective device 5a, 5b, 5c light up.

A further threshold value is determined in the process, wherein, when the approximate value for a device 5a, 5b, 5c does not achieve the further threshold value, no acknowledgment signal is emitted for this device 5a, 5b, 5c. In this way, it is possible to prevent a confusingly large number of devices 5a, 5b, 5c from reacting to an initiation gesture, although the initiation direction is clearly far away from individual devices 5a, 5b, 5c.

Relevant devices 5a, 5b, 5c can thus be selected, for which an acknowledgment signal is emitted. For example, the driver 2 performs an initiation gesture by pointing with the outstretched fingers of one hand approximately toward the door 5b in the interior of the transportation vehicle 1. The more precisely the initiation direction of his or her initiation gesture is pointed toward the door 5b, the brighter the light sources 6.1 to 6.8 of the illumination system 6b of the sliding door 5b light up.

If the approximate value for an initiation gesture and a particular device 5a, 5b, 5c exceeds a particular threshold value, then the corresponding device 5a, 5b, 5c is selected. In the above example, the sliding door 5b is selected when the initiation gesture was performed in such a way that the initiation direction points toward the sliding door 5b with sufficient precision. In a further exemplary embodiment, a duration can in this case be defined as a further selection condition, wherein the device can be selected when the driver 2 points toward the device 5a, 5b, 5c for the duration of the defined time; that is, when the approximate value exceeds the threshold value for the defined period of time. Moreover, a selection gesture can be defined.

Operating possibilities for the selected device 5a, 5b, 5c are then generated and displayed, wherein the operating possibility display contains information about possible operations for the selected device 5a, 5b, 5c. In the exemplary embodiment shown, the operating possibility display is provided by the illumination systems 6a, 6b, 6c of devices 5a, 5b, 5c. The direction in which a movement is detected as an operating gesture is thereby indicated.

This direction is indicated in the exemplary embodiment by a chase effect, similar to the dynamic activation of the light sources 6.1 to 6.8 of the illumination system 6a as explained above with reference to FIG. 2b. In the exemplary embodiment, light sources 6.1 to 6.8 are arranged in a row on the upper edge of the sliding door 5b of the transportation vehicle 1. Owing to a chase effect from a position on the left edge of the upper rim of the sliding door 5b to the right edge of the sliding door 5b, the user is signaled that he or she can perform a movement to the right that will be detected and interpreted as an operating gesture. In the example of the sliding door 5b, the possibility of opening the sliding door 5b, for instance, can be signaled to the user. Conversely, a chase effect from right to left can signal that a movement to the left is defined as an operating gesture, such as to close the door. In a further exemplary embodiment, it is similarly possible to utilize chase effects of the illumination system 6a of the speaker 5a to signal that movements both to the right and to the left can be detected as operating gestures, wherein changes in volume in different directions correspond to operating gestures with different directions.

Here, the possible operating gestures are not necessarily limited to the operating possibilities displayed by the operating possibility display because, for example, the output units 6a, 6b, 6c permit only a limited display of the various operating possibilities. In a further exemplary embodiment, a display device, such as a screen in the transportation vehicle 1, is alternatively or additionally used to display the operating possibilities. In this case, complex and numerous operating possibilities can be presented.

The driver 2 then performs an operating gesture, such an operating gesture that was signaled by the operating possibility display. The operating gesture is detected by the gesture detection unit 4, and a control signal is generated by the control unit 3 and transmitted to the selected device 5a, 5b, 5c.

On the basis of the control signal, the selected device 5a, 5b, 5c carries out a function, such as a change in volume by the speaker 5a or the opening or closing of the sliding door 5b. In a further exemplary embodiment, a function acknowledgment signal is generated and emitted while the function is being performed, which informs the driver 2 about which function is being carried out by which unit 5a, 5b, 5c of the transportation vehicle 1. The function acknowledgment signal is emitted here, as long as the function is being carried out, such as during the opening process for the sliding door 5b or during an incremental adjustment to the volume of the speaker 5a. In other exemplary embodiments, the function acknowledgment signal can be emitted for a defined duration.

In a further exemplary embodiment, an activation signal is received, wherein the generation of the activation signal can occur by methods that are known per se. For example, the user 2 can operate a switch, voice recognition can be used, or an activation gesture can be detected and the activation signal generated. The operation of the devices 5a, 5b, 5c by gesture is activated on the basis of this activation signal; in other words, the gesture-based operation of devices 5a, 5b, 5c is activated in an operation upstream of the disclosed method, for example, to avoid an unintentional adjustment.

Furthermore, the activation can affect a sub-set of the devices 5a, 5b, 5c of the transportation vehicle 1 so that, for example, some devices 5a, 5b, 5c can be continuously operated by gestures while other devices 5a, 5b, 5c can be controlled by gestures only when this gesture-based control has been activated. For instance, the activation signal can also be generated automatically, such as on the basis of a driving situation of the transportation vehicle 1. For example, the opening of the sliding door 5b of the transportation vehicle 1 can be activated in instances when the transportation vehicle 1 comes to a stop and deactivated when the transportation vehicle 1 is in motion.

In a further exemplary embodiment, the speed at which the gesture is performed is taken into consideration during the evaluation of the gestures by the driver 2, in particular, during the evaluation of the operating gestures. For example, if a setting parameter is changed by the operating gesture, the adjustment can be changed more significantly the faster the operating gesture is performed. Moreover, when the initiation gesture is performed at a higher speed, the threshold value for the approximate value can be modified, for example, such that when the initiation gesture is performed especially fast, a less precise indication of the device 5a, 5b, 5c to be selected in the transportation vehicle 1 is required to select the device 5a, 5b, 5c.

LIST OF REFERENCE SIGNS

1 Transportation vehicle
2 Driver
2a Detection Space
3 Control Unit
4 Gesture Detection Unit
5a Speaker
5b Sliding Door
5c Trunk Lid
6a, 6b, 6c Output Unit, Illumination System
6.1, 6.2, 6.3, 6.4, 6.5, 6.6, 6.7, 6.8 Light Sources
7 Illuminating Light Source

The invention claimed is:

1. A method for providing a user interface for at least one device of a transportation vehicle, the method comprising:
assigning a certain location to the at least one device;
detecting an initiation gesture by a user, wherein an initiation direction is associated with the initiation gesture and an approximate value is determined for the device based on the initiation direction, wherein the approximate value quantifies how the user is indicating the certain location;
generating and emitting an acknowledgement signal based on the approximate value;
selecting a device when the approximate value exceeds a particular threshold value;
generating and displaying an operating possibility display for the selected device, wherein the operating possibility display contains information about possible operations for the selected device;
detecting an operating gesture by the user; and
generating and transmitting a control signal for the selected device to the device based on the detected operating gesture;
wherein the acknowledgement signal and/or the operating possibility display are/is emitted to establish a spatial reference to the device.

2. The method of claim 1, wherein the acknowledgement signal includes a light distribution.

3. The method of claim 2, wherein the light distribution of the acknowledgement signal includes a light parameter, wherein the light parameter is created as a function of the approximate value.

4. The method of claim 2, wherein the operating possibility display includes a dynamic light distribution and at least one spatial direction is represented by the dynamic light distribution.

5. The method of claim 1, wherein the operating possibility display includes a graphical element.

6. The method of claim 1, wherein a function is performed by the selected device based on the control signal, wherein a function acknowledgement signal is generated and emitted while the function is being performed.

7. The method of claim 1, wherein an activation signal is received, and the operation of a device by gesture is activated based on this activation signal.

8. The method of claim 1, wherein the initiation gesture and/or the operating gesture by the user is detected in a detection space, wherein the detection space includes the immediate surroundings of the user in a transportation vehicle seat of the transportation vehicle.

9. The method of claim 1, wherein a transportation vehicle door is actuated or an air conditioner of the transportation vehicle is adjusted by the control signal.

10. The method of claim 1, wherein the device comprises an audio playback system, and the operating possibilities include operating gestures in opposite directions, wherein the volume of the audio playback system is controlled by the generated control signal.

11. The method of claim 1, wherein the operating gesture has a speed, and the control signal is generated as a function of the speed of the operating gesture.

12. A system for providing a user interface for at least one device arranged in, or assigned, a certain location in a transportation vehicle, the system comprising:
 a gesture detection unit which detects an initiation gesture by a user, wherein an initiation direction is associated with the initiation gesture and an approximate value is determined for the device based on the initiation direction, wherein the approximate value quantifies how the user is indicating the certain location of the device;
 a control unit which generates an acknowledgement signal based on the approximate value; and
 an output unit which emits the acknowledgement signal;
 wherein the device is selected by the control unit, and an operating possibility display for the selected device is generated and displayed by the output unit in response to approximate value exceeding a particular threshold value,
 wherein the operating possibility display contains information about possible operations for the selected device,
 wherein a control gesture by the user is detected by the gesture detection unit,
 wherein a control signal for the selected device is generated and transmitted to the device by the control unit in response to the detected operating gesture, and
 wherein the acknowledgement signal and/or the operating possibility display are/is emitted to establish a spatial reference to the device.

13. The system of claim 12, wherein:
 the output unit has at least one elongate illumination system, which extends from a first position to a second position, and
 the acknowledgement signal and/or the operating possibility display includes a dynamic light effect that is generated in that an illumination parameter is modified along the elongate illumination system starting from the first position to the second position.

14. The system as claimed in of claim 12, characterized in that wherein the device comprises a sliding door, an air conditioner, a screen or an audio playback system of the transportation vehicle.

* * * * *